(12) United States Patent
Tsuda et al.

(10) Patent No.: US 11,056,921 B2
(45) Date of Patent: Jul. 6, 2021

(54) WIRELESS POWER TRANSMISSION SYSTEM

(71) Applicant: NITTO DENKO CORPORATION, Ibaraki (JP)

(72) Inventors: Hisashi Tsuda, Osaka (JP); Masami Inoue, Osaka (JP); Taiki Sueyoshi, Osaka (JP); Hajime Nishio, Osaka (JP); Hiroshi Yamazaki, Osaka (JP); Hiromoto Haruta, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/649,755

(22) PCT Filed: Sep. 11, 2018

(86) PCT No.: PCT/JP2018/033615
§ 371 (c)(1),
(2) Date: Mar. 23, 2020

(87) PCT Pub. No.: WO2019/073736
PCT Pub. Date: Apr. 18, 2019

(65) Prior Publication Data
US 2020/0280218 A1    Sep. 3, 2020

(30) Foreign Application Priority Data

Oct. 11, 2017   (JP) .............................. JP2017-198000

(51) Int. Cl.
*H02J 50/40* (2016.01)
*H02J 50/90* (2016.01)
(Continued)

(52) U.S. Cl.
CPC ................ *H02J 50/40* (2016.02); *H02J 7/02* (2013.01); *H02J 50/12* (2016.02); *H02J 50/90* (2016.02)

(58) Field of Classification Search
None
See application file for complete search history.

(56) References Cited

U.S. PATENT DOCUMENTS

2014/0333260 A1    11/2014  Sayles
2015/0180286 A1*    6/2015  Asanuma ................ H02J 50/90
                                                        307/104
(Continued)

FOREIGN PATENT DOCUMENTS

GB    2 117 579 A    10/1983
JP    2011-229314 A    11/2011
(Continued)

OTHER PUBLICATIONS

Nov. 27, 2018 International Search Report issued in International Patent Application No. PCT/JP2018/033615.
(Continued)

*Primary Examiner* — Cassandra F Cox
(74) *Attorney, Agent, or Firm* — Oliff PLC (57) ABSTRACT

A wireless power transmission system includes a power transmission device including a plurality of power transmission portions, and a power receiving object including a power receiving portion capable of receiving an electric power wirelessly transmitted from the power transmission portion. Of the plurality of power transmission portions, a specific power transmission portion transmits the electric power to the power receiving portion.

10 Claims, 6 Drawing Sheets

(51) Int. Cl.
*H02J 50/12* (2016.01)
*H02J 7/02* (2016.01)

(56) References Cited

U.S. PATENT DOCUMENTS

2017/0279294 A1  9/2017  Fujii
2019/0044365 A1  2/2019  Vu et al.

FOREIGN PATENT DOCUMENTS

JP  2011-232550 A  11/2011
JP  2017-135831 A  8/2017
WO  2016/043135 A1  3/2016

OTHER PUBLICATIONS

Feb. 2, 2021 Extended Search Report issued in European patent Application No. 18865972.6.

* cited by examiner

WIRELESS POWER TRANSMISSION SYSTEM

TECHNICAL FIELD

The present invention relates to a wireless power transmission system.

BACKGROUND ART

Conventionally, a wireless power transmission system has been known in which an electric power is wirelessly transmitted from a power transmission device to a power receiving object by using wireless power transmission such as electromagnetic induction-type and magnetic field resonance-type. The power transmission device includes a power transmission coil that generates the magnetic field, and the power receiving object includes a power receiving coil that receives the electric power by the magnetic field generated by the power transmission coil.

The wireless power transmission system is used for various industrial products, and for example, a power receiving and supplying system in which the power receiving object is a hearing aid, and the power transmission device is a battery charger has been proposed (ref: for example, Patent Document 1).

In the power receiving and supplying system, the battery charger includes a housing cup having a housing space that is capable of housing the hearing aid, and a plurality of power transmission coils disposed so as to generate a magnetic field in the entire housing space.

In the power receiving and supplying system, the electric power is transmitted from the power transmission coil to the power receiving coil in a state where the hearing aid is housed in the housing space of the housing cup regardless of the direction and the position of the hearing aid.

CITATION LIST

Patent Document

Patent Document 1: Japanese Unexamined Patent Publication No. 2017-135831

SUMMARY OF THE INVENTION

Problem to be Solved by the Invention

In the power receiving and supplying system described in Patent Document 1, all of the power transmission coils are operated in order to generate the magnetic field in the entire housing space at the time of transmission of the electric power, and thus, there is a limit in achieving a reduction in electric power consumption.

The present invention provides a wireless power transmission system that is capable of achieving a reduction in electric power consumption.

Means for Solving the Problem

The present invention [1] includes a wireless power transmission system including a power transmission device including a plurality of power transmission portions, and a power receiving object including a power receiving portion capable of receiving an electric power wirelessly transmitted from the power transmission portion, wherein of the plurality of power transmission portions, a specific power transmission portion transmits the electric power to the power receiving portion.

According to the structure, of the plurality of power transmission portions, the specific power transmission portion transmits the electric power to the power receiving portion, so that a reduction in electric power consumption can be achieved compared to a case where all of the power transmission portions are operated at the time of transmission of the electric power.

The present invention [2] includes the wireless power transmission system described in the above-described [1] further including a positioning portion positioning the placed power receiving object, wherein the power receiving object is capable of receiving an electric power in a state of being positioned by the positioning portion.

According to the structure, the power receiving object is positioned by the positioning portion, so that the power receiving portion that is positioned can efficiently receive the electric power from the specific power transmission portion, so that improvement of transmission efficiency of the electric power can be achieved.

The present invention [3] includes the wireless power transmission system described in the above-described [2], wherein the power transmission device further includes a wall portion extending in a vertical direction and provided with at least one of the plurality of power transmission portions, and the wall portion also functions as the positioning portion.

According to the structure, at least one of the plurality of power transmission portions is provided in the wall portion, and the wall portion functions as the positioning portion, so that the power transmission portion can surely transmit the electric power to the power receiving portion in a state where the power receiving object is positioned by the wall portion. Thus, the improvement of the transmission efficiency of the electric power can be surely achieved.

In various power receiving objects, there is a limit in space where the power receiving portion can be disposed. Thus, when the power transmission portion is provided on the surface on which the power receiving object is placed, there may be a case where the power receiving portion cannot be disposed in a preferable position with respect to the power transmission portion at the time of placement of the power receiving object, so that the transmission efficiency of the electric power is reduced.

Meanwhile, according to the above-described structure, the power transmission portion is provided in the wall portion, so that even in the above-described case, there may be a case where the power receiving portion can be disposed in a preferable position with respect to the power transmission portion at the time of the placement of the power receiving object.

The present invention [4] includes the wireless power transmission system described in the above-described [3], wherein the power transmission device further includes a placement portion enabling placement of the power receiving object, and the wall portion is integrally provided with the placement portion.

According to the structure, the wall portion is integrally provided with the placement portion enabling the placement of the power receiving object, so that a placement posture of the power receiving object can be set. Thus, the power transmission portion can further more surely transmit the electric power to the power receiving portion in a state where the power receiving object is positioned by the wall portion, and the improvement of the transmission efficiency of the electric power can be further more surely achieved.

The present invention [5] includes the wireless power transmission system described in any one of the above-described [2] to [4], wherein the positioning portion can position the power receiving object in a plurality of positions, and the plurality of power transmission portions are provided corresponding to the plurality of positions of the power receiving object.

When the power receiving object is a large-sized product compared to a small-sized product such as hearing aid, a large number of (for example, three or more) power transmission portions are required to configure the wireless power transmission system so as to be capable of transmitting the electric power with respect to the entire region enabling the placement of the power receiving object.

Meanwhile, according to the above-described structure, the positioning portion can position the power receiving object in the plurality of positions, and the plurality of power transmission portions are provided corresponding to the plurality of positions of the power receiving object, so that compared to a case where the electric power is capable of being transmitted with respect to the entire region enabling the placement of the power receiving object, the electric power can be efficiently wirelessly transmitted from the corresponding power transmission portion to the power receiving portion in a state where the power receiving object is positioned in each of the positions, while a reduction in number of the power transmission portion can be achieved.

As a result, wireless transmission of the electric power is possible in each of the positions of the power receiving object, while a reduction in production cost of the wireless power transmission system can be achieved, so that the improvement of workability of the wireless transmission of the electric power with respect to the power receiving object can be achieved.

Effect of the Invention

According to the wireless power transmission system of the present invention, a reduction in electric power consumption can be achieved.

DESCRIPTION OF EMBODIMENTS

First Embodiment

1. Wireless Power Transmission Unit

A wireless power transmission unit 1 (a wireless electric power transmission unit 1) as a first embodiment of a wireless power transmission system of the present invention is described with reference to FIGS. 1 to 2B.

Figure 1:
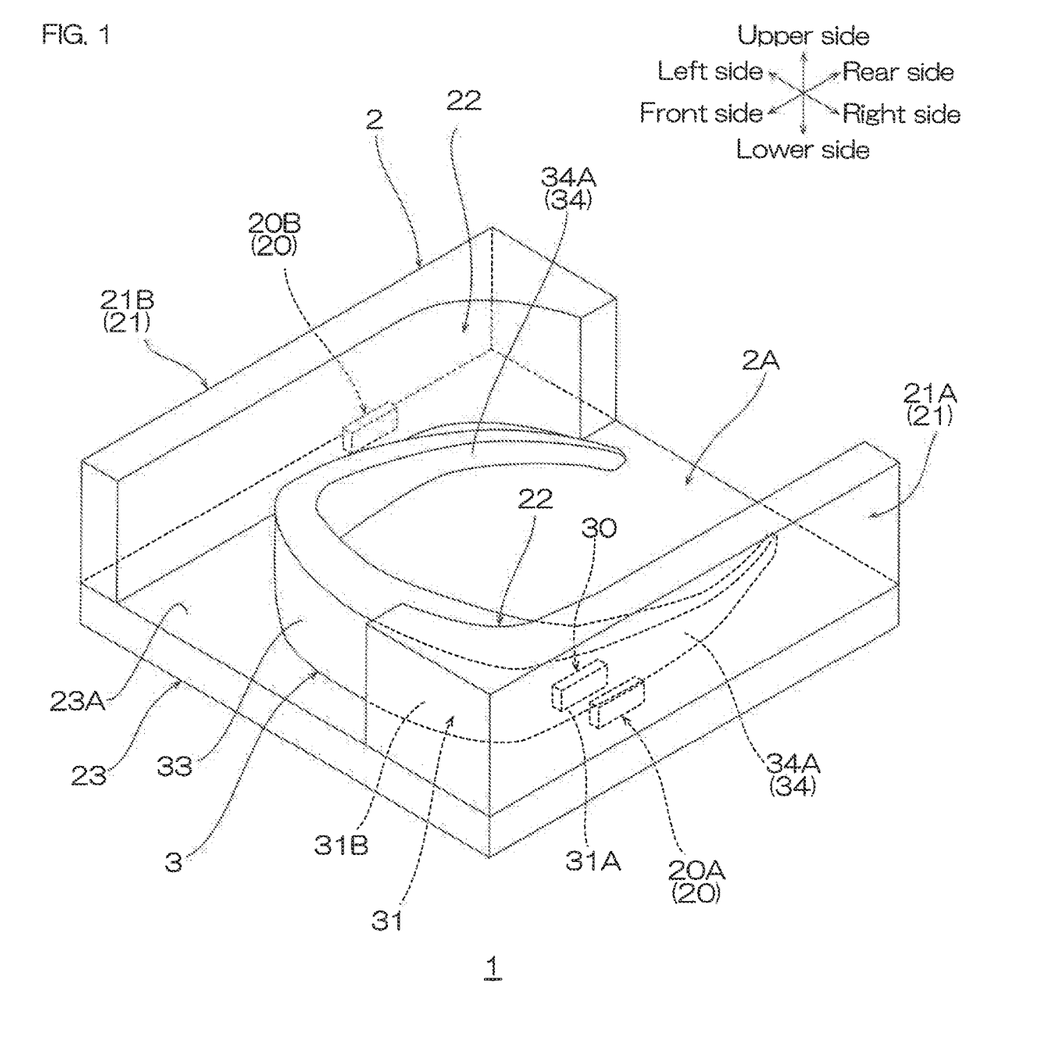
FIG. 1 shows a perspective view of a wireless power transmission unit as a first embodiment of a wireless power transmission system of the present invention.

As shown in FIG. 1, the wireless power transmission unit 1 includes a power receiving object 3 (an electric power receiving object 3) and a power transmission device 2 (an electric power transmission device 2), and is configured to be capable of wirelessly transmitting an electric power from the power transmission device 2 to the power receiving object 3. A wireless power transmission system of the wireless power transmission unit 1 is not particularly limited as long as the electric power can be transmitted by a magnetic field, and any one of an electromagnetic induction-type and a magnetic field resonance-type may be used.

In the following description, when referring to the direction of the wireless power transmission unit 1, with a state where the wireless power transmission unit 1 is placed on a horizontal surface (flat surface perpendicular to a vertical direction) as a reference, a predetermined direction perpendicular to the vertical direction is referred to as a front-rear direction (first direction), the lower-left side on the plane of the sheet in FIG. 1 is referred to as a front side (one side in the first direction), and the upper-right side on the plane of the sheet in FIG. 1 is referred to as a rear side (the other side in the first direction). The vertical direction is the same direction as a gravity direction (hereinafter, the same).

Also, with a view when the wireless power transmission unit 1 is viewed from the front side as a reference of the right and the left, the direction perpendicular to both directions of the vertical direction and the front-rear direction is referred to as a right-left direction (second direction), the lower-right side on the plane of the sheet in FIG. 1 is referred to as a right side (one side in the second direction), and the upper-left side on the plane of the sheet in FIG. 1 is referred to as a left side (the other side in the second direction). To be specific, directions are in conformity with direction arrows described in each view.

2. Power Receiving Object

The power receiving object 3 is not particularly limited, and examples thereof include wearable device that is capable of being mounted on a human body (for example, head mount display, brain wave sensor, glasses, smart watch, ring, or the like), AV equipment (for example, portable music player, IC recorder, portable DVD player, or the like), medical equipment (for example, measuring apparatus, treatment apparatus, or the like), and voice communication terminal (for example, cellular phone, smart phone, or the like).

In the first to the fourth embodiments, of the above-described power receiving objects, a case where the power receiving object 3 is the wearable device is described. To be more specific, in the first and the second embodiments, a case where the power receiving object is a head mount display (hereinafter, referred to as a HMD 3) is described; in the third embodiment, a case where the power receiving object is a brain wave sensor 4 is described; and in the fourth embodiment, a case where the power receiving object is a smart glass 5 is described.

The HMD 3 is a non-transmissive head mount display. The HMD 3 is used by being mounted on a head portion of a user, and is configured to display an image in front of the user's eyes who is mounted with it. The HMD 3 includes a display portion 33 and a mounting portion 34.

In a state where the HMD 3 is mounted on the user, the display portion 33 is positioned in front of the user's eyes and is capable of displaying an image for the user. The mounting portion 34 is capable of being mounted along the head portion of the user. The mounting portion 34 supports the display portion 33 so that the display portion 33 is positioned in front of the user's eyes in a state of being mounted on the head of the user. The mounting portion 34 is continuous to the display portion 33. A structure of the mounting portion 34 is not particularly limited, and in the first and the second embodiments, the mounting portion 34 consists of one pair of temple portions 34A that are disposed at spaced intervals to each other in a right-left direction. Each of the one pair of temple portions 34A extends in a front-rear direction continuously from the end portion in the right-left direction of the display portion 33.

Figure 3:
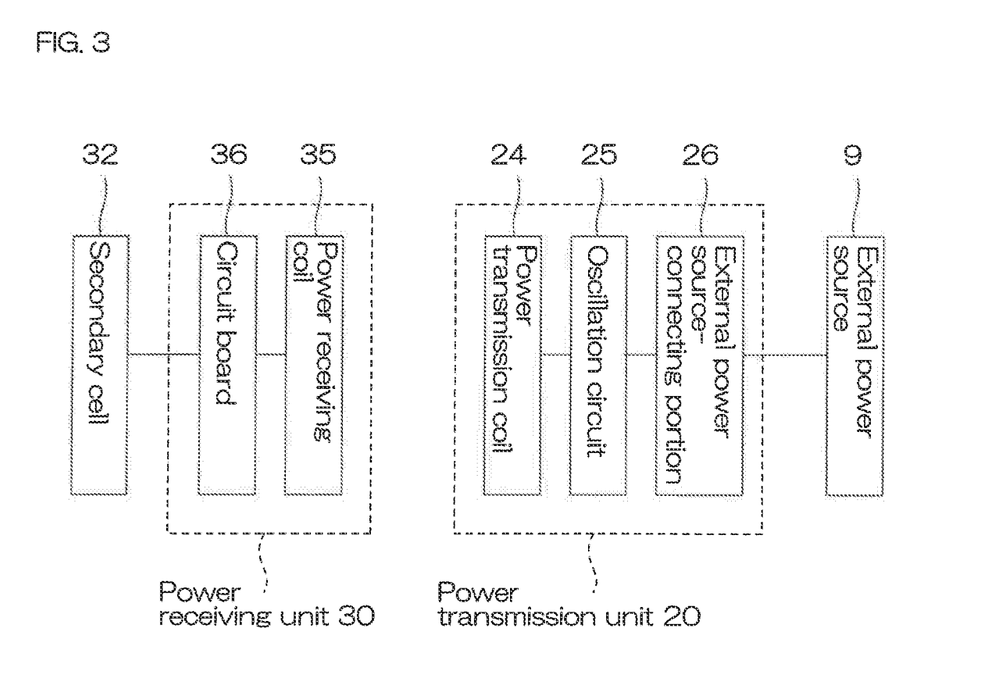
FIG. 3 shows a block view of a power transmission unit and a power receiving unit shown in FIG. 1.

The HMD 3 includes a power receiving unit 30 (an electric power receiving unit 30) and a secondary cell 32 (ref: FIG. 3).

The power receiving unit 30 is embedded in the side portion of the HMD 3. As shown in FIG. 3, the power receiving unit 30 includes a power receiving coil 35 (an electric power receiving coil 35) as one example of a power receiving portion, and a circuit board 36.

The power receiving coil 35 is capable of receiving an electric power that is wirelessly transmitted from a power transmission coil 24 (an electric power transmission coil 24) (described later). To be specific, the power receiving coil 35 is capable of generating an electric power by a magnetic field generated from the power transmission coil 24 (described later). Although not shown, the power receiving coil 35 is formed from a wire extending in a spiral shape. The wire is, for example, formed from an electrically conductive metal such as copper. In a state where the HMD 3 is horizontally placed, an axis of the power receiving coil 35 crosses the vertical direction (gravity direction), and preferably, is perpendicular to the vertical direction (gravity direction).

The circuit board 36 is configured to supply an electric current from the power receiving coil 35 to the secondary cell 32 at the time of charging of the secondary cell 32, and is also configured to supply the electric current from the secondary cell 32 to the display portion 33 at the time of discharging of the secondary cell 32. Although not shown, the circuit board 36 includes a wire pattern, and a control element. The wire pattern is electrically connected to each of the display portion 33, the power receiving coil 35, and the secondary cell 32. The control element controls the electric power that flows in the wire pattern. The control element includes a rectifier (AC/DC converter), a charging controller, a transformer, or the like.

The secondary cell 32 is a chargeable and dischargeable cell, and examples thereof include lithium ion secondary cell, nickel-hydrogen secondary cell, and silver-zinc secondary cell.

As shown in FIG. 1, the HMD 3 further includes a contact surface 31. The contact surface 31 is a portion of the outer-surface of the HMD 3, and to be more specific, is a portion of the peripheral surface of the HMD 3 extending in the vertical direction. The contact surface 31 includes a first contact portion 31A and a second contact portion 31B.

Figure 2A:
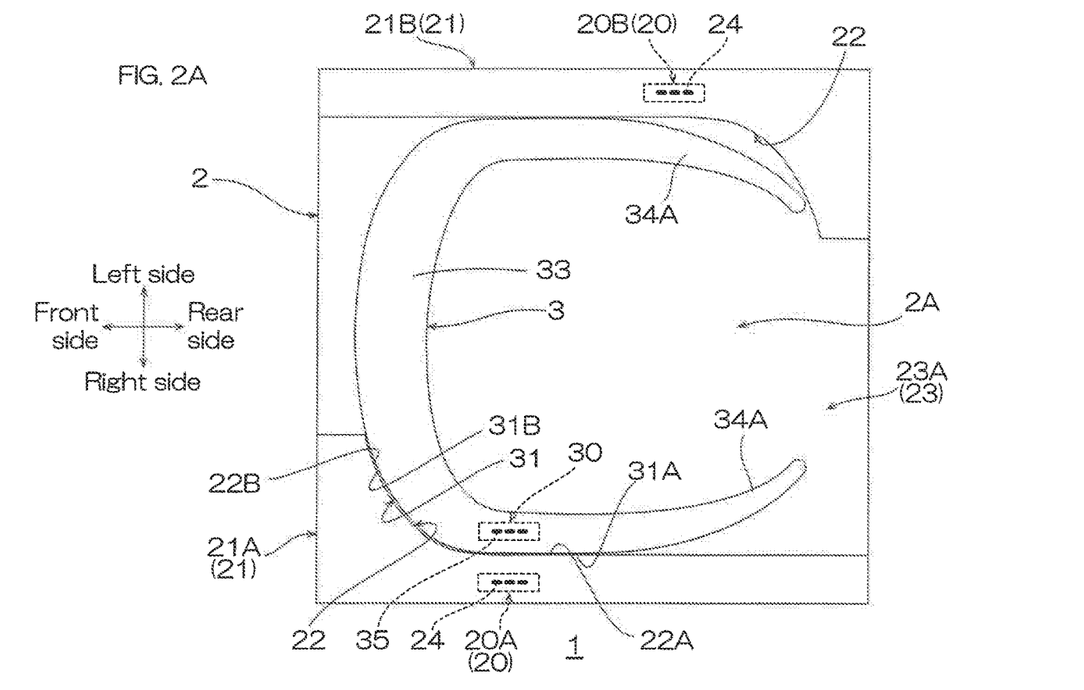
FIG. 2A shows a plan view of the wireless power transmission unit shown in FIG. 1, and shows a state in which a HMD is positioned in a first position.

As shown in FIG. 2A, the first contact portion 31A is positioned on the side surface of the HMD 3. The first contact portion 31A is disposed so as to be overlapped with the power receiving unit 30 (the power receiving coil 35) when projected in the right-left direction. The first contact portion 31A is disposed at the same side as the side at which the power receiving unit 30 is provided in the right-left direction. The first contact portion 31A is positioned at spaced intervals to the power receiving unit 30 in the right-left direction. The first contact portion 31A extends so as to cross the right-left direction, and preferably, extends along the front-rear direction so as to be perpendicular to the right-left direction.

The second contact portion 31B is positioned on the front surface of the HMD 3. The second contact portion 31B is disposed so as to be overlapped with the power receiving unit 30 (the power receiving coil 35) when projected in the front-rear direction. The second contact portion 31B is positioned at spaced intervals to the power receiving unit 30 in the front-rear direction. The second contact portion 31B is continuous to the first contact portion 31A. The second contact portion 31B has a generally circular arc shape when viewed from the top. The second contact portion 31B is continuous from the front end portion of the first contact portion 31A, and curves inwardly in the right-left direction (center in the right-left direction of the HMD 3) toward the front side.

3. Power Transmission Device

As shown in FIG. 1, the power transmission device 2 enables the placement of the HMD 3, and is capable of transmitting the electric power to the HMD 3 that is placed thereon. The power transmission device 2 includes a placement portion 23, a plurality of wall portions 21, and a plurality of power transmission units 20 (electric power transmission units 20).

The placement portion 23 enables the placement of the HMD 3. The placement portion 23 has a rectangular flat plate shape when viewed from the top. The placement portion 23 has a predetermined thickness, extends in the front-rear direction and the right-left direction, and has a flat front surface (upper surface) and a flat rear surface (lower surface). In the following, the upper surface of the placement portion 23 is defined as a placement surface 23A.

The plurality of wall portions 21 are disposed on the placement surface 23A of the placement portion 23, and are integrally provided with the placement portion 23. Each of the plurality of wall portions 21 extends in the vertical direction (gravity direction).

To be specific, the plurality of wall portions 21 are the two wall portions 21, and consist of a first wall portion 21A and a second wall portion 21B. The first wall portion 21A and the second wall portion 21B are disposed in both end portions in the right-left direction of the placement surface 23A, and face at spaced intervals to each other in the right-left direction. Each of the inner-surfaces in the right-left direction of the first wall portion 21A and the second wall portion 21B extends in the vertical direction. The inner-surface in the right-left direction of the first wall portion 21A, the inner-surface in the right-left direction of the second wall portion 21B, and the placement surface 23A define a housing space 2A that is capable of housing the HMD 3. The first wall portion 21A and the second wall portion 21B are configured to be point-symmetrical (180° rotationally symmetrical) when viewed from the top. Of the first wall portion 21A and the second wall portion 21B, the first wall portion 21A is described, and the description of the second wall portion 21B is omitted.

The first wall portion 21A is the wall portion 21 at the right side of the two wall portions 21. The inner-surface in the right-left direction of the first wall portion 21A includes a positioning surface 22 as one example of a positioning portion. That is, the wall portion 21 functions as a positioning portion as well.

The positioning surface 22 positions the HMD 3 that is placed on the power transmission device 2. To be more specific, the positioning surface 22 of the first wall portion 21A can position (ref: FIG. 2A) the HMD 3 in a first position (described later), and the positioning surface 22 of the second wall portion 21B can position (ref: FIG. 2B) the HMD 3 in a second position (described later). That is, the positioning surface 22 (the positioning surface 22 of the first wall portion 21A or the positioning surface 22 of the second wall portion 21B) can position the HMD 3 in one position. Thus, the plurality of positioning surfaces 22 can position the HMD in the plurality of positions.

The positioning surface 22 includes a first positioning portion 22A and a second positioning portion 22B.

The first positioning portion 22A corresponds to the first contact portion 31A of the contact surface 31, and the first positioning portion 22A has the same shape as that of the first contact portion 31A. The first positioning portion 22A extends so as to cross the right-left direction, and preferably extends along the front-rear direction so as to be perpendicular to the right-left direction.

The second positioning portion 22B is positioned at the front side with respect to the first positioning portion 22A. The second positioning portion 22B corresponds to the second contact portion 31B of the contact surface 31. The second positioning portion 22B has the same shape as that of the second contact portion 31B. The second positioning portion 22B has a generally circular arc shape when viewed from the top. The second positioning portion 22B is continuous to the first positioning portion 22A. The second positioning portion 22B is continuous from the front end portion of the first positioning portion 22A, and curves inwardly in the right-left direction (center in the right-left direction of the HMD 3) toward the front side.

The one power transmission unit 20 is provided in each of the wall portions 21. To be specific, the plurality of power transmission units 20 are the two power transmission units 20, and consist of a first power transmission unit 20A (a first electric power transmission unit 20A) provided in the first wall portion 21A and a second power transmission unit 20B (a second electric power transmission unit 20B) provided in the second wall portion 21B.

As shown in FIG. 3, each of the power transmission units 20 (the first power transmission unit 20A and the second power transmission unit 20B) includes the power transmission coil 24 as one example of a power transmission portion (an electric power transmission portion), an oscillation circuit 25, and an external power source-connecting portion 26. That is, each of the wall portions 21 is provided with the one power transmission coil 24, and the power transmission device 2 includes the plurality of power transmission coils 24 (the power transmission coil 24 of the first power transmission unit 20A and the power transmission coil 24 of the second power transmission unit 20B). The plurality of power transmission coils 24 are provided corresponding to the plurality of positions of the HMD 3.

As shown in FIG. 2A, the first power transmission unit 20A and the second power transmission unit 20B have the same structure, and are disposed so as to be point-symmetrical (180° rotationally symmetrical) when viewed from the top. Then, of the first power transmission unit 20A and the second power transmission unit 20B, the first power transmission unit 20A is described, and the description of the second power transmission unit 20B is omitted.

The first power transmission unit 20A is embedded in the first wall portion 21A. The first power transmission unit 20A (the power transmission coil 24) is disposed so as to be overlapped with the front end portion of the first positioning portion 22A of the positioning surface 22 when projected in the right-left direction. The first power transmission unit 20A is positioned outwardly in the right-left direction at spaced intervals to the front end portion of the first positioning portion 22A.

The power transmission coil 24 of the first power transmission unit 20A is provided corresponding to the first position of the HMD 3 (ref: FIG. 2A). The power transmission coil 24 of the second power transmission unit 20B is provided corresponding to the second position of the HMD 3 (ref: FIG. 2B).

The power transmission coil 24 is capable of wirelessly transmitting the electric power to the power receiving coil 35. To be specific, the power transmission coil 24 is capable of wirelessly transmitting the electric power in the right-left direction (horizontal direction), and generating the magnetic field. Although not shown, the power transmission coil 24 may have the same structure as that of the power receiving coil 35, or may be a spiral coil obtained by winding around a wire material such as copper wire. The axis of the power transmission coil 24 extends so as to cross the vertical direction, and preferably extends along the right-left direction so as to be perpendicular to the vertical direction.

As shown in FIG. 3, the oscillation circuit 25 is capable of generating an electric power having a frequency of, for example, 1 MHz or more and 10 MHz or less, preferably 1 MHz or more and 5 MHz or less. The oscillation circuit 25 is electrically connected to each of the power transmission coil 24 and the external power source-connecting portion 26. Examples of the oscillation circuit 25 include LC oscillation circuit, CR oscillation circuit, crystal oscillation circuit, and switching circuit.

The external power source-connecting portion 26 is capable of being connected to an external power source 9 that is provided at the outside of the wireless power transmission unit 1. Examples of the external power source-connecting portion 26 include AC adapter and USB terminal.

4. Power Receiving Operation (Charging Operation)

Next, the power receiving operation of the HMD 3 is described with reference to FIGS. 2A and 2B.

First, the power transmission device 2 in a state before the HMD 3 is set is described.

In the power transmission device 2 before the HMD 3 is set, the external power source-connecting portion 26 is connected to the external power source 9, and all of the plurality of power transmission coils 24 periodically transmit the electric power. The electric power transmitted periodically may be the same as or lower than the electric power transmitted continuously to be described later.

The plurality of wall portions 21 allow the insertion of the HMD 3 when the HMD 3 is inserted into the housing space 2A so as to be positioned in the first position (ref: FIG. 2A) where the display portion 33 is at the front side or in the second position (ref: FIG. 2B) where the display portion 33 is at the rear side. Meanwhile, the plurality of wall portions 21 are brought into contact with the HMD 3 and prohibit the insertion of the HMD 3 with respect to the housing space 2A when the HMD 3 is inserted into the housing space 2A so as to be positioned in another position excluding the first position and the second position.

As shown in FIG. 2A, when the HMD 3 is housed in the housing space 2A so as to be positioned in the first position, the HMD 3 is placed horizontally on the placement surface 23A of the placement portion 23.

At this time, the contact surface 31 is brought into contact with the positioning surface 22 included in the first wall portion 21A. To be more specific, the first contact portion 31A of the contact surface 31 is brought into contact with the first positioning portion 22A of the positioning surface 22 in the right-left direction, and the second contact portion 31B of the contact surface 31 is brought into contact with the second positioning portion 22B of the positioning surface 22 in the front-rear direction. At this time, the positioning surface 22 of the second wall portion 21B may be in contact with the HMD 3 in the right-left direction or may be positioned at minute spaced intervals thereto in the right-left direction.

In this manner, the positioning surface 22 of the first wall portion 21A positions the HMD 3 in the horizontal direction (front-rear direction and right-left direction), and positions the HMD 3 in the first position.

When the HMD 3 is positioned in the first position, the power receiving unit 30 faces the first power transmission unit 20A at spaced intervals thereto in the right-left direction. The power receiving coil 35 faces the power transmission coil 24 of the first power transmission unit 20A in the right-left direction.

Then, the power receiving coil 35 receives the electric power that is periodically transmitted from the power transmission coil 24 of the first power transmission unit 20A.

At this time, the power receiving coil 35 receives the electric power from the power transmission coil 24 of the first power transmission unit 20A, so that a voltage, a standing wave ratio, impedance, or the like fluctuate in the power transmission coil 24 of the first power transmission unit 20A. Meanwhile, the electric power from the power transmission coil 24 of the second power transmission unit 20B is not received by the power receiving coil 35, so that in the power transmission coil 24 of the second power transmission unit 20B, the voltage, the standing wave ratio, the impedance, or the like do not fluctuate. When the power receiving coil 35 receives the electric power, load resistance of the circuit board 36 may fluctuate. In this manner, in the power transmission coil 24 that transmits the electric power to the power receiving coil 35, the voltage, the standing wave ratio, the impedance, or the like fluctuate.

The power transmission device 2 detects the power transmission coil 24 (the power transmission coil 24 of the first power transmission unit 20A) having a relatively large fluctuation amount of the voltage, the standing wave ratio, the impedance, or the like.

In this way, the power transmission device 2 detects that the HMD 3 is placed in the first position, and specifies the power transmission coil 24 (the power transmission coil 24 of the first power transmission unit 20A) having the best transmission efficiency with respect to the power receiving coil 35.

The circuit board 36 may transmit the situation of the secondary cell 32 (for example, remaining battery capacity or the like) to the power transmission device 2 as a digital signal by discrete fluctuation of the load resistance. In this manner, the power transmission device 2 can receive the situation of the secondary cell 32.

Thereafter, the power transmission device 2 stops the periodical power transmission from the power transmission coil 24 of the second power transmission unit 20B.

Next, the power transmission device 2 continuously transmits the electric power from the power transmission coil 24 of the first power transmission unit 20A. In other words, of the plurality of power transmission coils 24, the specific power transmission coil 24 (the power transmission coil 24 of the first power transmission unit 20A) transmits the electric power to the power receiving coil 35, and of the plurality of power transmission coils 24, another power transmission coil 24 excluding the specific power transmission coil 24 (the power transmission coil 24 of the second power transmission unit 20B) stops the power transmission.

The power receiving coil 35 receives the electric power that is transmitted from the specific power transmission coil 24.

Figure 2B:
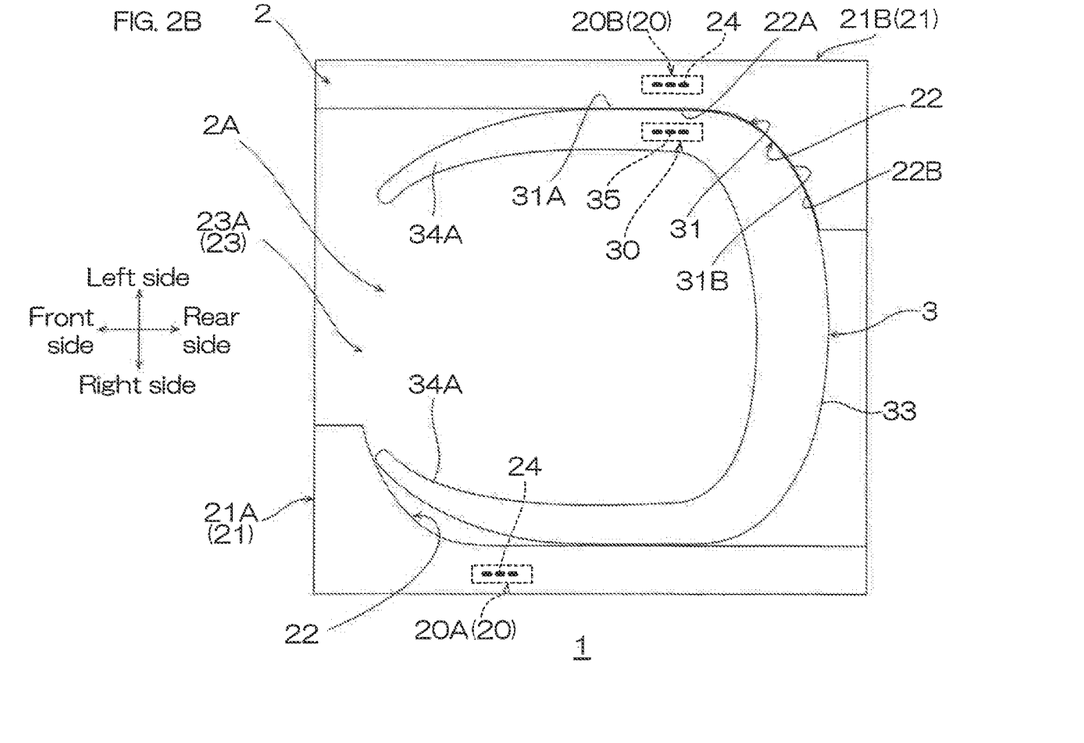
FIG. 2B shows a plan view of the wireless power transmission unit shown in FIG. 1, and shows a state in which a HMD is positioned in a second position.

As shown in FIG. 2B, when the HMD 3 is housed in the housing space 2A so as to be positioned in the second position, the contact surface 31 is brought into contact with the positioning surface 22 included in the second wall portion 21B. To be more specific, the first contact portion 31A is in contact with the first positioning portion 22A in the right-left direction, and the second contact portion 31B is in contact with the second positioning portion 22B in the front-rear direction.

In this manner, the positioning surface 22 of the second wall portion 21B positions the HMD 3 in the horizontal direction (front-rear direction and right-left direction), and positions the HMD 3 in the second position.

When the HMD 3 is positioned in the second position, the power receiving unit 30 faces the second power transmission unit 20B at spaced intervals thereto in the right-left direction. The power receiving coil 35 faces the power transmission coil 24 of the second power transmission unit 20B in the right-left direction.

Then, the power transmission device 2 detects the placement of the HMD 3 in the second position in the same manner as the description above, and specifies the power transmission coil 24 (the power transmission coil 24 of the second power transmission unit 20B) having the best transmission efficiency with respect to the power receiving coil 35. Thereafter, the power transmission device 2 stops the periodical power transmission from the power transmission coil 24 of the first power transmission unit 20A.

Next, the power transmission device 2 continuously transmits the electric power from the power transmission coil 24 of the second power transmission unit 20B. Then, the power receiving coil 35 receives the electric power transmitted from the power transmission coil 24 of the second power transmission unit 20B.

In this way, the HMD 3 receives the electric power by the positioning surface 22 in a state of being positioned in the first position or the second position.

Thereafter, as shown in FIG. 3, the electric power is supplied from the power receiving coil 35 to the secondary cell 32 via the circuit board 36. In this manner, the secondary cell 32 is charged. Thereafter, when the charging of the secondary cell 32 is completed, the circuit board 36 transmits a communication signal (digital signal) to the power transmission device 2 in the same manner as the description above, and the power transmission device 2 stops the power transmission by the communication signal from the circuit board 36.

The electric power charged in the secondary cell 32 is appropriately supplied from the secondary cell 32 to the display portion 33 via the circuit board 36 to operate the display portion 33. The electric power received by the power receiving coil 35 can be directly supplied to the display portion 33 via the circuit board 36 without being supplied to the secondary cell 32 via the circuit board 36.

As shown in FIGS. 2A and 2B, in the wireless power transmission unit 1, of the plurality of power transmission coils 24, the specific power transmission coil 24 transmits the electric power to the power receiving coil 35. Thus, compared to a case where all of the power transmission coils 24 are operated at the time of transmission of the electric power, a reduction in electric power consumption can be achieved.

The HMD 3 is positioned by the positioning surface 22. Thus, the power receiving coil 35 that is positioned can efficiently receive the electric power from the specific power transmission coil 24, and improvement of the transmission efficiency of the electric power can be achieved.

The power transmission coil 24 of the first power transmission unit 20A is provided in the first wall portion 21A, and the power transmission coil 24 of the second power transmission unit 20B is provided in the second wall portion 21B. Each of the first wall portion 21A and the second wall portion 21B includes the positioning surface 22. Thus, the power transmission coil 24 can surely transmit the electric power to the power receiving coil 35 in a state where the HMD 3 is positioned by the wall portion 21. As a result, the improvement of the transmission efficiency of the electric power can be surely achieved.

In the HMD 3, there is a limit in space where the power receiving coil 35 can be disposed. Thus, when the power transmission coil 24 is provided in the placement portion 23, the power receiving coil 35 cannot be disposed in a preferable position with respect to the power transmission coil 24 at the time of the placement of the HMD 3, so that the transmission efficiency of the electric power is reduced. Meanwhile, in the power transmission device 2, the power transmission coil 24 is provided in the wall portion 21, so that the power receiving coil 35 can be disposed in a preferable position with respect to the power transmission coil 24 at the time of the placement of the HMD 3.

The wall portion 21 is integrally provided with the placement portion 23. Thus, a placement posture of the HMD 3 can be set. As a result, the power transmission coil 24 can further more surely transmit the electric power to the power receiving coil 35 in a state where the HMD 3 is positioned by the wall portion 21, and the improvement of the transmission efficiency of the electric power can be further more surely achieved.

When the power receiving object is the HMD 3 or the like, the large number of (for example, three or more) power transmission coils 24 are required to configure the power transmission device 2 so as to be capable of transmitting the electric power with respect to the entire housing space 2A that houses the HMD 3.

Meanwhile, in the power transmission device 2, the positioning surface 22 (the positioning surface 22 of the first wall portion 21A and the positioning surface 22 of the second wall portion 21B) can position the HMD 3 in the plurality of positions, and the plurality of power transmission coils 24 are provided corresponding to the plurality of positions of the HMD 3.

Thus, compared to a case where the electric power is capable of being transmitted with respect to the entire housing space 2A, the electric power can be efficiently wirelessly transmitted from the corresponding power transmission coil 24 to the power receiving coil 35 in a state where the HMD 3 is positioned in each of the positions, while a reduction in number of the power transmission coil 24 can be achieved.

As a result, wireless transmission of the electric power is possible in each of the positions of the HMD 3, while a reduction in production cost of the wireless power transmission unit 1 can be achieved, so that the improvement of workability of the wireless transmission of the electric power with respect to the HMD 3 can be achieved.

In the first embodiment, the power transmission device 2 detects the position of the HMD 3 by the transmission of the electric power between the power transmission coil 24 and the power receiving coil 35, and specifies the power transmission coil 24 having the best transmission efficiency with respect to the power receiving coil 35. However, a specifying method of the power transmission coil 24 is not particularly limited. For example, the power transmission device 2 mechanically or optically detects the position of the HMD 3, and may specify the power transmission coil 24 having the best transmission efficiency with respect to the power receiving coil 35.

An example of a mechanical detecting method includes a method in which a mechanical switch corresponding to each of the power transmission units 20 is provided so as to be contactable with the contact surface 31.

An example of an optical detecting method includes a method in which a reflection-type optical sensor corresponding to each of the power transmission units 20 is provided so as to be reflectable on the contact surface 31.

Second Embodiment

Figure 4:
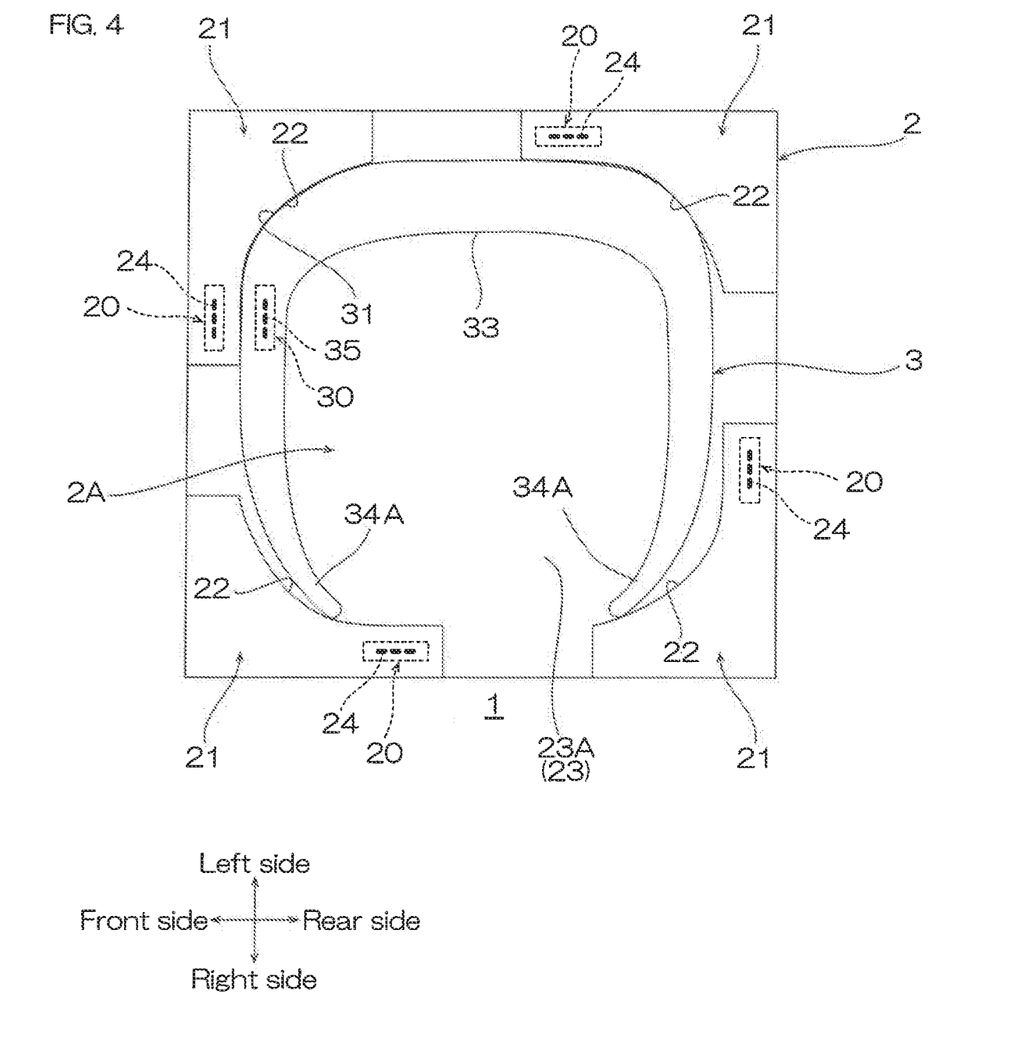
FIG. 4 shows a plan view of a wireless power transmission unit as a second embodiment of a wireless power transmission system of the present invention.

Next, the second embodiment of the present invention is described with reference to FIG. 4. In the second embodiment, the same reference numerals are provided for members corresponding to each of those in the above-described first embodiment, and their detailed description is omitted.

In the first embodiment, as shown in FIGS. 2A and 2B, when the HMD 3 is disposed in any one of the two positions (the first position and the second position), the power transmission device 2 is capable of housing the HMD 3. However, the present invention is not limited to this.

In the second embodiment, when the HMD 3 is disposed in any one of the four positions, the power transmission device 2 is capable of housing the HMD 3. The power transmission device 2 includes the four power transmission units 20 including the power transmission coils 24 corresponding to the four positions of the HMD 3. To be more specific, the power transmission device 2 includes the four wall portions 21, each of which is provided with the power transmission unit 20.

The four wall portions 21 are disposed at spaced intervals to each other in a peripheral direction of a symmetric axis so as to be 90° rotationally symmetrical with the predetermined symmetric axis as the center. Each of the four wall portions 21 has the positioning surface 22. The positioning surfaces 22 of the four wall portions 21, and the placement surface 23A define the housing space 2A that is capable of housing the HMD 3.

The four wall portions 21 allow the insertion of the HMD 3 when the HMD 3 is inserted into the housing space 2A so as to be positioned in any one of the first position (not shown) where the display portion 33 is at the front side, the second position (not shown) where the display portion 33 is at the rear side, the third position (not shown) where the display portion 33 is at the right side, and the fourth position where the display portion 33 is at the left side.

Meanwhile, the four wall portions 21 are brought into contact with the HMD 3 and prohibit the insertion of the HMD 3 with respect to the housing space 2A when the HMD 3 is inserted into the housing space 2A so as to be positioned in another position excluding the four positions.

When the HMD 3 is housed in the housing space 2A so as to be positioned in any one of the above-described four positions, the contact surface 31 is brought into contact with the positioning surface 22 included in the corresponding wall portion 21. In this manner, the HMD 3 is positioned in any one of the four positions.

Then, the power transmission device 2 detects the placement of the HMD 3 in any one of the above-described four positions in the same manner as the description above, specifies the power transmission coil 24 having the best transmission efficiency with respect to the power receiving coil 35, and stops the power transmission from another power transmission coil 24.

Thereafter, the power transmission device 2 continuously transmits the electric power from the specific power transmission coil 24, and the power receiving coil 35 receives the electric power transmitted from the specific power transmission coil 24.

In this way, the HMD 3 receives the electric power by the positioning surface 22 in a state of being positioned in any one of the above-described four positions.

In the second embodiment, the same function and effect as that of the first embodiment can be achieved. In view of a reduction in the production cost of the wireless power transmission unit 1, the first embodiment is preferable.

Third Embodiment

Figure 5A:
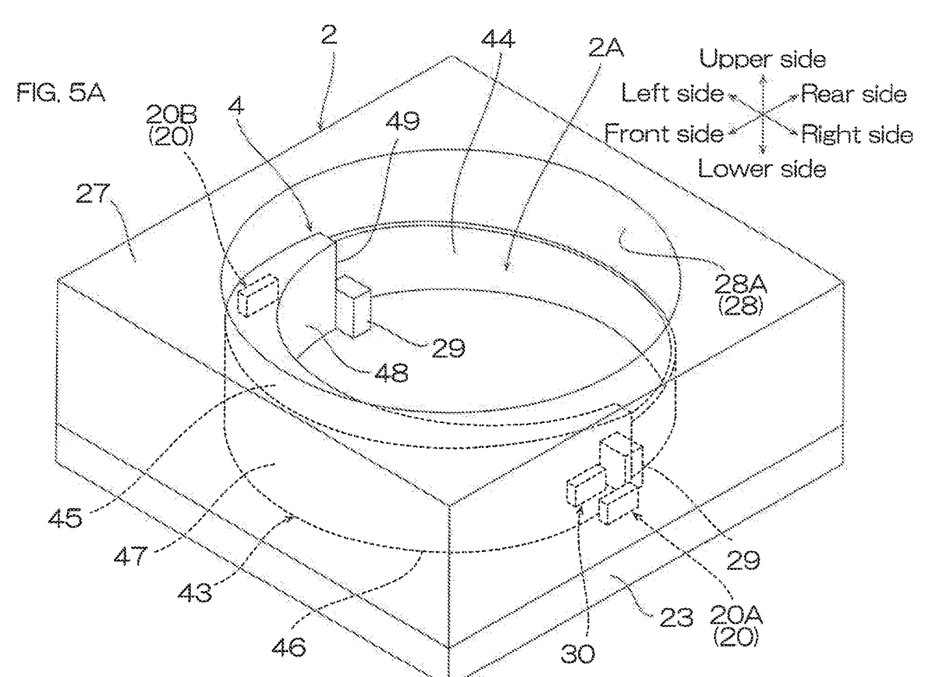
FIG. 5A shows a perspective view of a wireless power transmission unit as a third embodiment of a wireless power transmission system of the present invention.
Figure 5B:
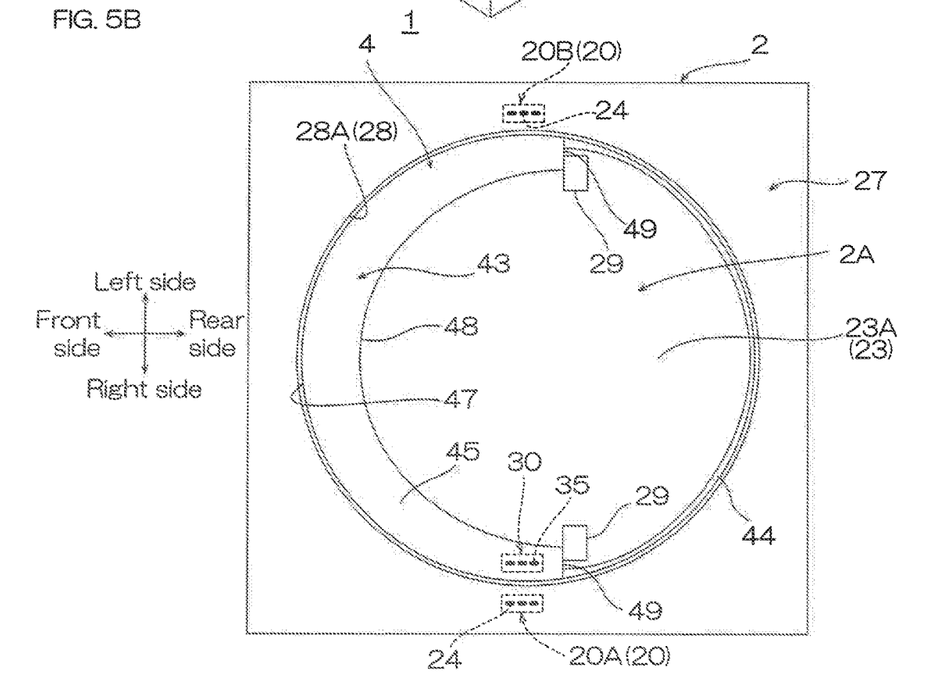
FIG. 5B shows a plan view of the wireless power transmission unit shown in FIG. 5A.

Next, the third embodiment of the present invention is described with reference to FIGS. 5A and 5B. In the third embodiment, the same reference numerals are provided for members corresponding to each of those in the above-described first and second embodiments, and their detailed description is omitted.

In the first embodiment, as shown in FIG. 1, the power receiving object is the HMD 3. However, the power receiving object is not particularly limited. In the third embodiment, the power receiving object is a brain wave sensor 4.

The brain wave sensor 4 is used by being mounted on the head portion of the user, and is configured to measure a brain wave of the user who is mounted with it. The brain wave sensor 4 includes a sensor portion 43 and a mounting portion 44.

In a state where the brain wave sensor 4 is mounted on the user, the sensor portion 43 is capable of measuring the brain wave of the user. The sensor portion 43 has a semi-circular arc shape when viewed from the top having an opening rearwardly. The sensor portion 43 has a first surface 45, a second surface 46, a third surface 47, a fourth surface 48, and a plurality of (two) contact surfaces 49.

The first surface 45 is a surface that is positioned at the upper side in a state where the brain wave sensor 4 is mounted on the user. The second surface 46 is a surface that is positioned at the lower side in a state where the brain wave sensor 4 is mounted on the user. The first surface 45 and the second surface 46 are positioned at spaced intervals to each other in the vertical direction.

The third surface 47 is the outer-peripheral surface (front-side peripheral surface) of the sensor portion 43, and has a semi-circular arc shape when viewed from the top. The third surface 47 connects the front end edge of the first surface 45 to that of the second surface 46 in the vertical direction. The fourth surface 48 is the inner-peripheral surface (rear-side peripheral surface) of the sensor portion 43, and has a semi-circular arc shape when viewed from the top. The fourth surface 48 is positioned at the rear side of the third surface 47 at spaced intervals thereto in a radial direction of the sensor portion 43.

The plurality of (two) contact surfaces 49 are provided corresponding to a plurality of positioning portions 29 to be described later. To be specific, the plurality of (two) contact surfaces 49 are the two contact surfaces 49. Each of the two contact surfaces 49 connects the end portion in the right-left direction of the third surface 47 to that in the right-left direction of the fourth surface 48 in the right-left direction, and connects the first surface 45 to the second surface 46 in the vertical direction. Each of the two contact surfaces 49 extends in the vertical direction. The two contact surfaces 49 are positioned at spaced intervals to each other in the right-left direction.

The mounting portion 44 is capable of being mounted along the head portion of the user. The mounting portion 44 supports the sensor portion 43 so that the sensor portion 43 is positioned in the front head portion of the user in a state of being mounted on the head portion of the user. The mounting portion 44 has a semi-circular arc shape when viewed from the top having an opening forwardly. One end portion (right end portion) of the mounting portion 44 is connected to the contact surface 49 at the right side of the sensor portion 43, and the other end portion (left end portion) of the mounting portion 44 is connected to the contact surface 49 at the left side of the sensor portion 43.

The brain wave sensor 4 includes the power receiving unit 30 and the secondary cell 32 (ref: FIG. 3) in the same manner as that in the HMD 3. The power receiving unit 30 is embedded in the side portion of the brain wave sensor 4. To be more specific, of the two contact surfaces 49, the power receiving unit 30 is disposed at the front side of the contact surface 49 at the right side at spaced intervals thereto. The structure of the secondary cell 32 is the same as the description above.

The power transmission device 2 includes the placement portion 23, a wall portion 27, the plurality of power transmission units 20, and the plurality of (two) positioning portions 29. The structure of the placement portion 23 is the same as the description above.

The wall portion 27 is integrally provided with the placement portion 23. The wall portion 27 extends from the entire placement surface 23A of the placement portion 23 in the vertical direction. The wall portion 27 has an opening portion 28. The opening portion 28 has a circular shape when viewed from the top, and passes through the wall portion 27 in the vertical direction. In this manner, the central portion of the placement surface 23A of the placement portion 23 is exposed from the upper side via the opening portion 28. An inner-peripheral surface 28A of the opening portion 28 and the placement surface 23A exposed from the wall portion 27 define the housing space 2A that is capable of housing the brain wave sensor 4. A radius of the inner-peripheral surface 28A of the opening portion 28 is generally the same as a radius of curvature of the third surface 47 of the sensor portion 43.

The plurality of power transmission units 20 are provided in the wall portion 27. To be specific, the plurality of power transmission units 20 are the two power transmission units 20, and consist of the first power transmission unit 20A that is embedded in the right end portion of the wall portion 27, and the second power transmission unit 20B that is embedded in the left end portion of the wall portion 27. The first power transmission unit 20A is positioned at the right side of the opening portion 28 at spaced intervals thereto. The power transmission coil 24 of the first power transmission unit 20A is provided corresponding to the first position (described later) of the brain wave sensor 4. The second power transmission unit 20B is positioned at the left side of the opening portion 28 at spaced intervals thereto. The power transmission coil 24 of the second power transmission unit 20B is provided corresponding to the second position (described later) of the brain wave sensor 4.

The plurality of positioning portion 29 position the brain wave sensor 4 that is placed on the power transmission device 2. To be more specific, the plurality of positioning portions 29 are provided so as to be in contact with the corresponding contact surface 49 in the front-rear direction when the brain wave sensor 4 is housed in the housing space 2A. The plurality of positioning portions 29 are disposed at the inside of the housing space 2A and is integrally provided with the placement portion 23. To be specific, the plurality of positioning portions 29 are the two positioning portions 29. The two positioning portions 29 are disposed at spaced intervals to each other in the right-left direction. Of the two positioning portions 29, the positioning portion 29 at the right side is positioned at the rear-left side of the first power transmission unit 20A at spaced intervals thereto, and the positioning portion 29 at the left side is positioned at the rear-right side of the second power transmission unit 20B at spaced intervals thereto. Each of the two positioning portions 29 protrudes upwardly from the placement surface 23A.

In the power transmission device 2, the plurality of positioning portions 29 allow the insertion of the brain wave sensor 4 when the brain wave sensor 4 is inserted into the housing space 2A so as to be positioned in the first position or the second position (not shown). In the first position of the brain wave sensor 4, the sensor portion 43 is positioned at the front side, the first surface 45 is positioned at the upper side, and the second surface 46 is positioned at the lower side. The second position of the brain wave sensor 4 is a position that is reversed from the first position in an up-down direction. In the second position of the brain wave sensor 4, the sensor portion 43 is positioned at the front side, the first surface 45 is positioned at the lower side, and the second surface 46 is positioned at the upper side.

Meanwhile, the plurality of positioning portions 29 are brought into contact with the brain wave sensor 4 and prohibit the insertion of the brain wave sensor 4 with respect to the housing space 2A when the brain wave sensor 4 is inserted into the housing space 2A so as to be positioned in another position excluding the first position and the second position.

When the brain wave sensor 4 is housed in the housing space 2A so as to be positioned in the first position or the second position, the brain wave sensor 4 is placed horizontally on the placement surface 23A of the placement portion 23.

At this time, the contact surface 49 is positioned at the front side with respect to the corresponding positioning portion 29 and is brought into contact with the corresponding positioning portion 29 in the front-rear direction. The third surface 47 of the sensor portion 43 faces the inner-peripheral surface 28A of the opening portion 28. The third surface 47 may be in contact with the inner-peripheral surface 28A or may be positioned at minute spaced intervals thereto.

In this manner, the positioning portion 29 positions the brain wave sensor 4 in the horizontal direction (front-rear direction), and positions the brain wave sensor 4 in the first position or the second position.

The power transmission device 2 detects that the brain wave sensor 4 is placed in the first position or the second position in the same manner as the description above, specifies the power transmission coil 24 having the best transmission efficiency with respect to the power receiving coil 35, and stops the power transmission of another power transmission coil 24.

Next, the power transmission device 2 continuously transmits the electric power from the specific power transmission coil 24. The power receiving coil 35 receives the electric power that is transmitted from the specific power transmission coil 24.

In this way, the brain wave sensor 4 receives the electric power by the positioning portion 29 in a state of being positioned in the first position or the second position.

In the third embodiment, the same function and effect as that of the first embodiment can be achieved.

Fourth Embodiment

Figure 6A:
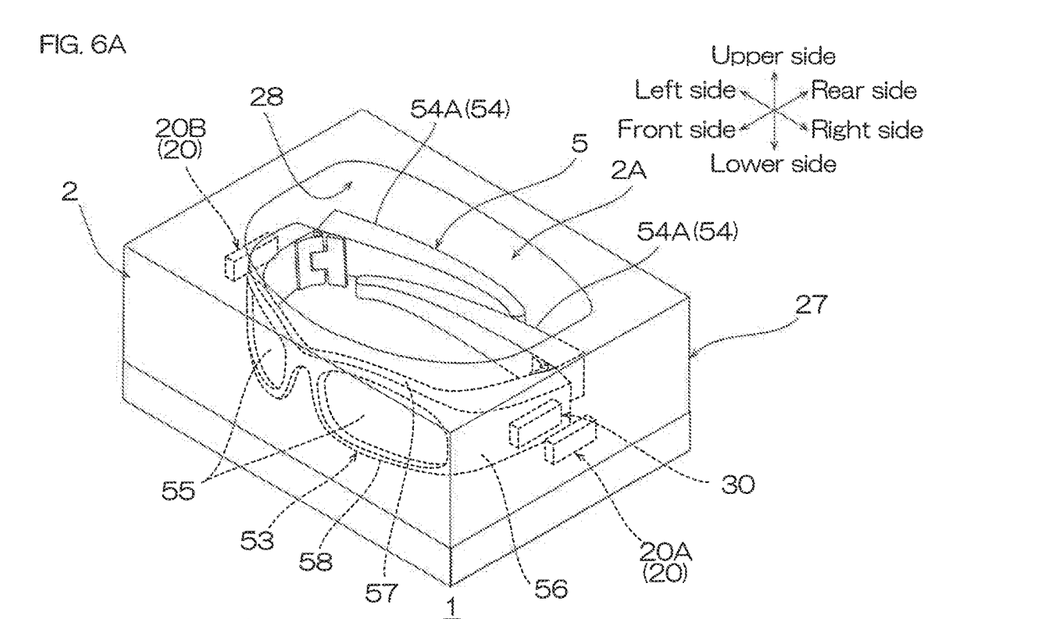
FIG. 6A shows a perspective view of a wireless power transmission unit as a fourth embodiment of a wireless power transmission system of the present invention.
Figure 6B:
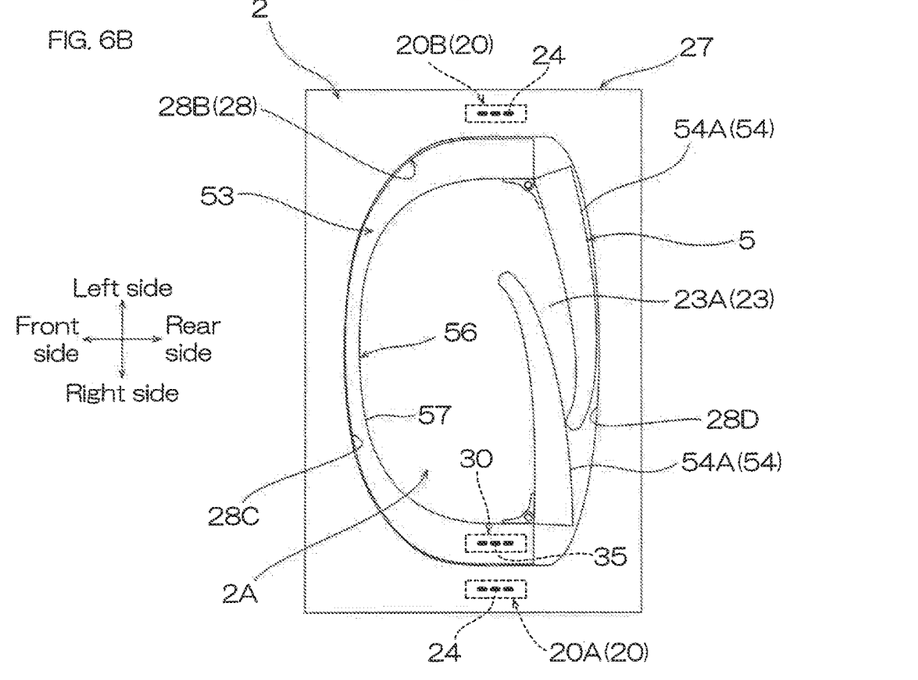
FIG. 6B shows a plan view of the wireless power transmission unit shown in FIG. 6A.

Next, the fourth embodiment of the present invention is described with reference to FIGS. 6A and 6B. In the fourth embodiment, the same reference numerals are provided for members corresponding to each of those in the above-described first to third embodiments, and their detailed description is omitted.

In the fourth embodiment, the power receiving object is the smart glass 5.

The smart glass 5 is an eyeglass-type, and is a transmissive head mount device. The smart glass 5 includes a glass portion 53 and a mounting portion 54.

The glass portion 53 includes two lenses 55 and a frame body 56. The two lenses 55 are positioned in front of the user's eyes in a state where the smart glass 5 is mounted on the user. The lenses 55 are optically transmissive, and is capable of displaying an image for the user. The frame body 56 supports the two lenses 55. The frame body 56 includes a first end portion 57 that is positioned at the upper end, and a second end portion 58 that is positioned at the lower end in a state where the smart glass 5 is mounted on the user. The first end portion 57 and the second end portion 58 are positioned at spaced intervals to each other in the vertical direction.

The mounting portion 54 supports the glass portion 53 so that the glass portion 53 is positioned in front of the user's eyes in a state of being mounted on the head portion of the user. The mounting portion 54 consists of one pair of temple portions 54A that are disposed at spaced intervals to each other in the right-left direction. Each of the one pair of temple portions 54A is pivotably fixed to the end portion in the right-left direction of the frame body 56 with a rotational axis extending in the vertical direction as a supporting point. In this manner, each of the one pair of temple portions 54A is pivotable in a developing position that extends in the front-rear direction, and in a folding position that is folded with respect to the frame body 56 and extends in the right-left direction.

The smart glass 5 includes the power receiving unit 30 and the secondary cell 32 (ref: FIG. 3) in the same manner as that of the HMD 3. The power receiving unit 30 is embedded in the side portion of the smart glass 5. To be more specific, the power receiving unit 30 is embedded in the right end portion of the frame body 56. The structure of the secondary cell 32 is the same as the description above.

The power transmission device 2 includes the placement portion 23, the wall portion 27, and the plurality of power transmission units 20. The structure of the placement portion 23 is the same as the description above.

The wall portion 27 has the opening portion 28. The opening portion 28 has a generally elliptical shape when viewed from the top, and passes through the wall portion 27 in the vertical direction. In this manner, the central portion of the placement surface 23A of the placement portion 23 is exposed from the upper side via the opening portion 28. An inner-peripheral surface 28B of the opening portion 28 and the placement surface 23A exposed from the wall portion 27 define the housing space 2A that is capable of housing the smart glass 5.

The inner-peripheral surface 28B of the opening portion 28 includes a first inner-peripheral portion 28C as one example of a positioning portion and a second inner-peripheral portion 28D.

The first inner-peripheral portion 28C is a front-side portion of the inner-peripheral surface 28B. The first inner-peripheral portion 28C has a shape along the frame body 56 of the smart glass 5, and has a U-shape having an opening rearwardly when viewed from the top.

The second inner-peripheral portion 28D is a rear-side portion of the inner-peripheral surface 28B. The second inner-peripheral portion 28D is continuous to the first inner-peripheral portion 28C. The second inner-peripheral portion 28D has a U-shape having an opening forwardly when viewed from the top. The second inner-peripheral portion 28D does not have a shape along the frame body 56 of the smart glass 5, and has a smaller size (dent) in the front-rear direction compared to the first inner-peripheral portion 28C.

The plurality of power transmission units 20 are provided in the wall portion 27, and to be specific, consist of the first power transmission unit 20A and the second power transmission unit 20B. The power transmission coil 24 of the first power transmission unit 20A is provided corresponding to the first position (described later) of the smart glass 5. The power transmission coil 24 of the second power transmission unit 20B is provided corresponding to the second position (described later) of the smart glass 5.

In the power transmission device 2, the wall portion 27 allows the insertion of the smart glass 5 when the one pair of temple portions 54A are positioned in the folding position, and the smart glass 5 is inserted into the housing space 2A so as to be positioned in the first position or the second position (not shown). In the first position of the smart glass 5, the glass portion 53 is positioned at the front side, the first end portion 57 of the frame body 56 is positioned at the upper side, and the second end portion 58 of the frame body 56 is positioned at the lower side. The second position of the smart glass 5 is a position that is reversed from the first position in the up-down direction. In the second position of the smart glass 5, the glass portion 53 is positioned at the front side, the first end portion 57 of the frame body 56 is positioned at the lower side, and the second end portion 58 of the frame body 56 is positioned at the upper side.

Meanwhile, when the one pair of temple portions 54A are positioned in the developing position, and when the one pair of temple portions 54A are positioned in the folding position, in a case where the smart glass 5 is positioned in another position excluding the first position and the second position, the wall portion 27 is brought into contact with the smart glass 5, and prohibits the entry of the smart glass 5 with respect to the housing space 2A.

When the smart glass 5 is housed in the housing space 2A so as to be positioned in the first position or the second position in a state where the one pair of temple portions 54A are positioned in the folding position, the smart glass 5 is placed horizontally on the placement surface 23A of the placement portion 23.

At this time, the frame body 56 is positioned at the rear side with respect to the first inner-peripheral portion 28C of the opening portion 28 and is brought into contact with the first inner-peripheral portion 28C in the front-rear direction. The one pair of temple portions 54A in the folding position are positioned at the front side of the second inner-peripheral portion 28D of the opening portion 28 at spaced intervals thereto.

In this manner, the first inner-peripheral portion 28C of the opening portion 28 positions the smart glass 5 in the horizontal direction (front-rear direction and right-left direction), and positions the smart glass 5 in the first position or the second position.

The power transmission device 2 detects that the smart glass 5 is placed in the first position or the second position in the same manner as the description above, specifies the power transmission coil 24 having the best transmission efficiency with respect to the power receiving coil 35, and stops the power transmission of another power transmission coil 24.

Next, the power transmission device 2 continuously transmits the electric power from the specific power transmission coil 24. The power receiving coil 35 receives the electric power that is transmitted from the specific power transmission coil 24.

In this way, the smart glass 5 receives the electric power by the first inner-peripheral portion 28C of the wall portion 27 in a state of being positioned in the first position or the second position.

In the fourth embodiment, the same function and effect as that of the first embodiment can be achieved.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The wireless power transmission system of the present invention can be applied for various industrial products, and among all, can be preferably used for wearable devices, AV equipment, medical equipment, voice communication terminals, or the like.

DESCRIPTION OF REFERENCE NUMERALS

1 Wireless power transmission unit
2 Power transmission device
3 HMD
4 Brain wave sensor
5 Smart glass
21 Wall portion
22 Positioning surface
23 Placement portion
24 Power transmission coil
27 Wall portion
28C First inner-peripheral portion
29 Positioning portion
35 Power receiving coil

The invention claimed is:

1. A wireless power transmission system comprising:
a power transmission device including:
a first wireless power transmission portion,
a second wireless power transmission portion,
a first outer side,
a second outer side opposite to the first outer side,
a third outer side, and
a fourth outer side opposite to the third outer side,
the first wireless power transmission portion being disposed on the third outer side between a midpoint of the third outer side and an endpoint of the third outer side that connects to the first outer side,
the second wireless power transmission portion being disposed on the fourth outer side between a midpoint of the fourth outer side and an endpoint of the fourth outer side that connects to the second outer side; and
a power receiving object including a power receiving portion configured to receive electric power wirelessly transmitted from the first or the second wireless power transmission portion, wherein
one of the first and the second wireless power transmission portions transmits the electric power to the power receiving portion, and the other of the first and the second wireless power transmission portions does not transmit the electric power to the power receiving portion, and
wherein the first and the second wireless power transmission portions each include a coil, the third outer side does not include coils between the midpoint and an endpoint connecting to the second outer side, and the fourth outer side does not include coils between the midpoint and an endpoint connecting to the first outer side.

2. The wireless power transmission system according to claim 1 further comprising:
a positioning portion that is arranged so as to position the power receiving object when the power receiving object is placed on the power transmission device, wherein
the power receiving object is configured to receive electric power in a state of being positioned by the positioning portion.

3. The wireless power transmission system according to claim 2, wherein
the positioning portion is a wall portion extending in a vertical direction and provided with at least one of the first or second wireless power transmission portions.

4. The wireless power transmission system according to claim 3, wherein
the power transmission device further includes a placement portion enabling placement of the power receiving object thereon, and
the wall portion is integrally provided with the placement portion.

5. The wireless power transmission system according to claim 2, wherein
the positioning portion is configured to position the power receiving object in a plurality of positions, and
the first and the second wireless power transmission portions are provided corresponding to the plurality of positions of the power receiving object.

6. The wireless power transmission system according to claim 1, wherein the first wireless power transmission portion and the second wireless power transmission portion are fixed in place.

7. The wireless power transmission system according to claim 1, wherein the power receiving object is a head-mounted display.

8. The wireless power transmission system according to claim 1, wherein the power transmission device further comprises a first wall and a second wall disposed opposite to each other,
in a plan view, the first wall has an L-shape with a curved surface connecting adjacent legs of the L-shape,
in the plan view, the second wall also has the L-shape with a curved surface connecting adjacent legs of the L-shape,
the first wireless power transmission portion is embedded in the first wall, and
the second wireless power transmission portion is embedded in the second wall.

9. The wireless power transmission system according to claim 8, wherein the power transmission device further comprises a third wireless power transmission portion, a fourth wireless power transmission portion, a third wall, and a fourth wall, the fourth wall being disposed opposite to the third wall,
in a plan view, the third wall has the L-shape with a curved surface connecting adjacent legs of the L-shape,
in the plan view, the fourth wall also has the L-shape with a curved surface connecting adjacent legs of the L-shape,
the third wireless power transmission portion is embedded in the third wall, and
the fourth wireless power transmission portion is embedded in the fourth wall.

10. The wireless power transmission system according to claim 1, wherein the first wireless power transmission portion and the second wireless power transmission portion periodically transmit electric power before the power receiving object is placed on the power transmission device, and one of the first and second wireless power transmission portions continually transmits electric power after the power receiving object is placed on the power transmission device.

* * * * *